(12) United States Patent
Cosentino et al.

(10) Patent No.: US 12,556,620 B2
(45) Date of Patent: *Feb. 17, 2026

(54) MESSAGE FORMAT INDICATOR FOR RESOURCE-CONSTRAINED DEVICES

(71) Applicant: RED HAT, INC., Raleigh, NC (US)

(72) Inventors: Andrea Cosentino, Rome (IT); Paolo Antinori, Novara (IT)

(73) Assignee: Red Hat, Inc., Raleigh, NC (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/653,400

(22) Filed: May 2, 2024

(65) Prior Publication Data

US 2024/0283850 A1 Aug. 22, 2024

Related U.S. Application Data

(63) Continuation of application No. 17/344,306, filed on Jun. 10, 2021, now Pat. No. 12,015,684.

(51) Int. Cl.
*H04L 67/565* (2022.01)
(52) U.S. Cl.
CPC .................. *H04L 67/565* (2022.05)
(58) Field of Classification Search
CPC .................................................. H04L 67/565
See application file for complete search history.

(56) References Cited

U.S. PATENT DOCUMENTS

| 2012/0136950 A1* | 5/2012 | Selph ................... H04L 51/066 709/206 |
| 2016/0294614 A1 | 10/2016 | Searle et al. |
| 2017/0230907 A1 | 8/2017 | Rose et al. |

(Continued)

FOREIGN PATENT DOCUMENTS

EP 2641365 B1 7/2019

OTHER PUBLICATIONS

Author unknown; Format Indicator—Enterprise Integration Patterns with WSO2 ESB—WSO2 Documentation; 2015; 1 pg; Retrieved from https://docs.wso2.com/display/IntegrationPatterns/Format+Indicator on Apr. 27, 2021.

(Continued)

*Primary Examiner* — Suraj M Joshi
(74) *Attorney, Agent, or Firm* — Kilpatrick Townsend & Stockton LLP

(57) ABSTRACT

Systems and methods for message format communication among resource-constrained devices are generally described. In some examples, a first message sent by an edge computing device may be received. A determination may be made that the first message comprises a first data format identifier. A determination may be made that the first message comprises a first data format patch. A determination may be made that the first data format identifier was previously stored in a data structure in association with a first data format. In various examples, the first data format may be modified using the first data format patch to generate a first modified data format. The first modified data format may be stored in the data structure in association with the first data format identifier. In some examples, a payload of the first message may be read using the first modified data format.

20 Claims, 8 Drawing Sheets

(56) References Cited

U.S. PATENT DOCUMENTS

2019/0273650 A1    9/2019   Ma

OTHER PUBLICATIONS

Raschbichler; Payload Format Description—MQTT 5 Essentials Part 8; Nov. 12, 2019; 6 pages; Retrieved from https://www.hivemq.com/blog/mqtt5-essentials-part8-payload-format-description/ on Apr. 27, 2021.
European Search Report of EP21188113; Jan. 13, 2022; 12 pgs.
Non-Final Office Action for U.S. Appl. No. 17/344,306 mailed Mar. 31, 2022.
Non-Final Office Action for U.S. Appl. No. 17/344,306 mailed Dec. 15, 2022.
Final Office Action for U.S. Appl. No. 17/344,306 mailed Aug. 18, 2022.
Final Office Action for U.S. Appl. No. 17/344,306 mailed Nov. 16, 2023.
Advisory Action for U.S. Appl. No. 17/344,306 mailed Nov. 4, 2022.
Advisory Action for U.S. Appl. No. 17/344,306 mailed Jan. 26, 2024.
European Examintion Report, EP 21 188 113.1-1203, Aug. 5, 2024.

\* cited by examiner

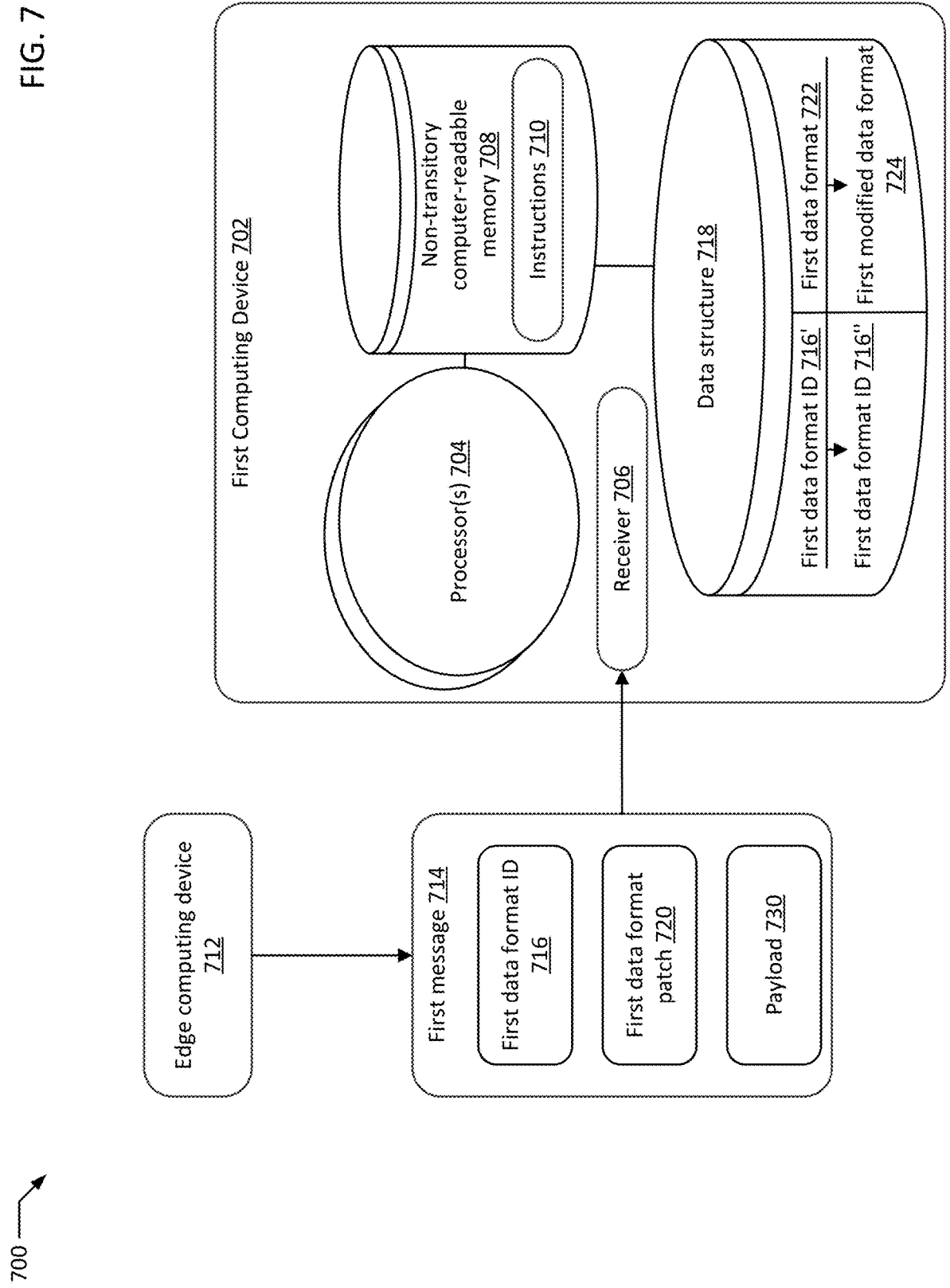

MESSAGE FORMAT INDICATOR FOR RESOURCE-CONSTRAINED DEVICES

CROSS-REFERENCE TO RELATED APPLICATION

This is a continuation of and claims priority to U.S. patent application Ser. No. 17/344,306, filed Jun. 10, 2021, the entire disclosure of which is hereby incorporated herein by reference.

BACKGROUND

The present disclosure generally relates to messaging protocols used in computer communication systems. For example, Representational State Transfer (REST) APIs use the synchronous paradigm of communication, where a message is sent and a response is waited for before making a new request. REST API calls are often referred to as "synchronous" API calls indicating that code execution and user interaction is stopped until the call returns the requested information. Other messaging architectures may be asynchronous, as code execution and/or user interaction need not stop to wait for the response. Event-driven architectures (EDAs) employ asynchronous communication. In EDAs, messages are sent by a "publisher" (an entity generating the data) to a message broker. The message broker may be infrastructure that stores the message and delivers the message to "subscribers" (applications that have registered to receive the particular message from the particular publisher). Various techniques described herein may refer to messaging protocols generally—whether synchronous or asynchronous.

SUMMARY

The present disclosure provides a new and innovative system, methods and apparatus for updating and/or identifying message formats in a message-based computer communication architecture. In an example, a device may include non-transitory computer-readable memory that is configured in communication with at least one processor. In some further examples, the device may include a receiver configured to receive messages. The non-transitory computer-readable memory may store instructions that, when executed by the at least one processor, are configured to receive, by the receiver, a first message sent by an edge computing device. In some further examples, the instructions may be further configured to determine that the first message comprises a first data format identifier. In various examples, the instructions may be further configured to determine that the first message comprises a first data format patch. In some other cases, the instructions may be further configured to determine that the first data format identifier was previously stored in a data structure in association with a first data format. In other examples, the instructions may be further configured to modify the first data format using the first data format patch to generate a first modified data format. In further examples, the instructions may be configured to store the first modified data format in the data structure in association with the first data format identifier. In some further examples, the instructions may be further configured to read a payload of the first message using the first modified data format.

In another example, a method of updating a message format may include receiving a first message sent by an edge computing device. In some examples, the method may further include determining that the first message comprises a first data format identifier. In some examples, the method may further include determining that the first message comprises a first data format patch. In still other examples, the method may include determining that the first data format identifier was previously stored in a data structure in association with a first data format. In some further examples, the method may include modifying the first data format using the first data format patch to generate a first modified data format. In other examples, the method may include storing the first modified data format in the data structure in association with the first data format identifier. In some cases, the method may include reading a payload of the first message using the first modified data format.

In yet another example, a method of providing an updated message format may include establishing a communication channel with a receiver device. In some examples, the method may include generating a first message of a first type. In some examples, the first message may include a first data format definition and a first data format identifier associated with the first data format definition. In various examples, the method may include sending the first message to a receiver device using the communication channel. In some examples, the method may include generating a second message of the first type. In some cases, the second message may include the first data format identifier and a patch. In various cases, the patch may include executable instructions effective to modify the first data format definition to generate a first modified data format definition. In some examples, the method may include sending the second message of the first type to the receiver device using the communication channel.

Additional features and advantages of the disclosed methods, devices, and/or systems are described in, and will be apparent from, the following Detailed Description and the Figures.

BRIEF DESCRIPTION OF THE FIGURES

FIG. 7 is block diagram of message data format communication between an edge computing device and another computing device according to an example of the present disclosure.

DETAILED DESCRIPTION OF EXAMPLE EMBODIMENTS

Figure 1:
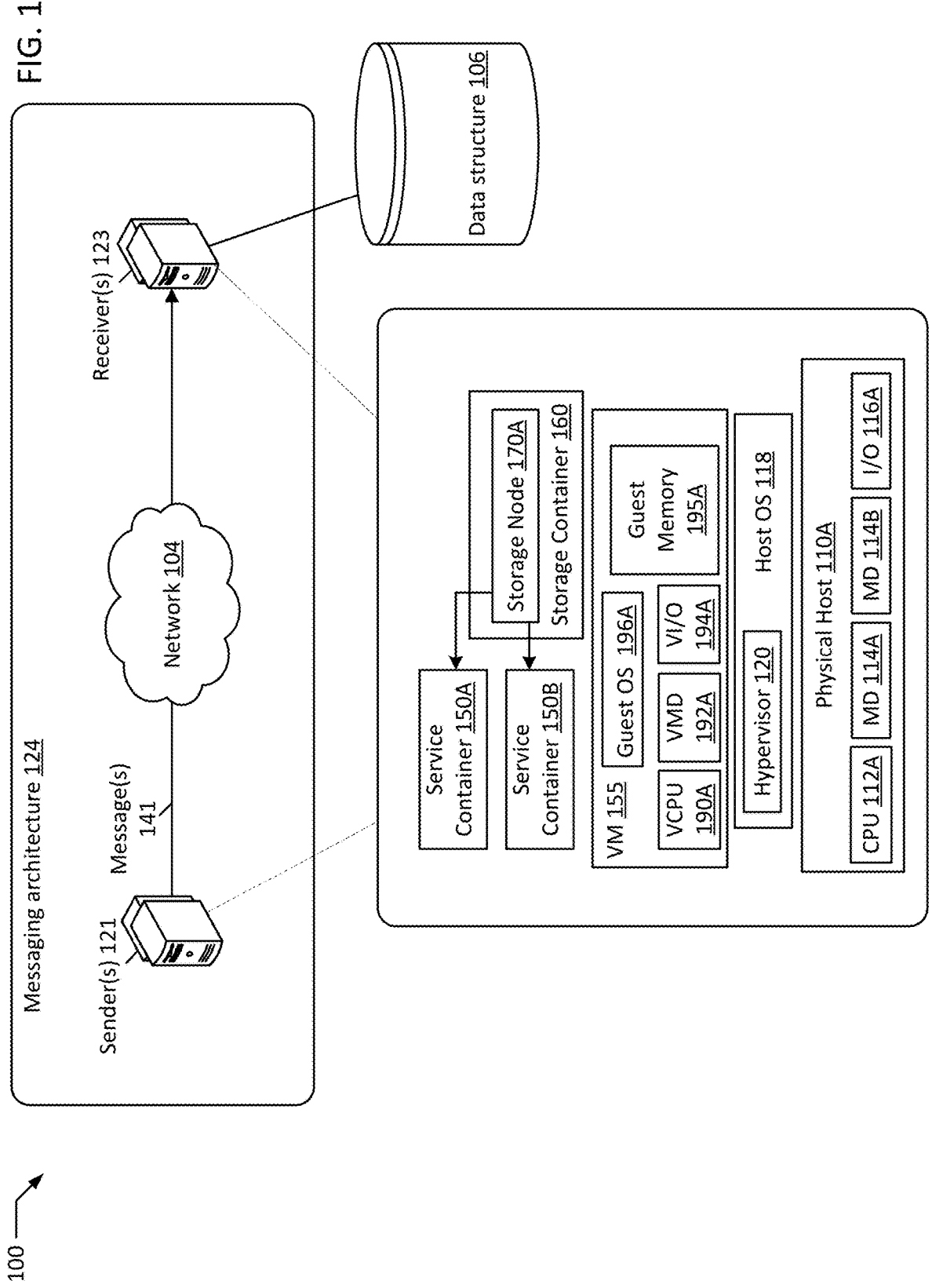
FIG. 1 is a block diagram of a computer messaging architecture, according to various examples of the present disclosure.

Many applications and/or compute systems communicate using message architectures, wherein messages of an agreed-upon format are sent between senders and receivers. However, the format may change over time for a variety of reasons. For example, software updates may occur, system integration updates may occur, new events may transpire which require an updated data format in order to represent such events in the message payloads, etc. Example messaging architectures are described in additional detail below.

In various examples, data formats (e.g., data defining the format) may be specified in the payload of each message sent between a sender and a receiver so that the receiver may directly determine the data format in order to correctly parse the message payload. In such an implementation, when the data format is updated, the updated format may be specified in the message payload. However, sending the data format with each message leads to larger message sizes and increased resource consumption. This is especially problematic for edge computing devices which may be resource constrained. For example, edge computing devices may have minimal processing capability, may have limited bandwidth, and/or may be battery powered. In such edge computing devices, providing the data format with each message may cause the battery-life to be drained more quickly and/or may cause increased CPU usage. Edge computing is described in additional detail below.

In various examples described herein, senders (e.g., devices and/or applications sending messages) may only send the full data format definition once per messaging session, instead of sending the full data format definition with each message. For example, senders may send the full data format definition together with data format identifier data once at the start of a messaging communication session. Thereafter, if messages are formatted according to that same data format, the senders may only send the data format identifier without including the full data format definition in the payload of each message. Receivers may use the data format identifier to lookup the data format definition that was extracted from the earlier message and stored in a data structure in association with the data format identifier.

Additionally, when a data format is updated, senders may send patch data comprising executable instructions configured to modify a previous data format definition together with the data format identifier for the relevant data format definition. A receiver may detect the patch included in the message and may use the data format identifier to lookup the appropriate data format definition to which to apply the patch. The receiver may modify the data format definition using the patch and may discard the previous version of the data format definition. Thereafter, when messages include the relevant data format identifier, the modified data format definition may be used to read the messages.

In edge computing systems, computing resources are often provisioned at different tiers and at different geographically distributed nodes. In such systems, it may be advantageous to deploy different compute resources at different hierarchical levels of the edge network in order to optimize compute footprint and/or performance. Deployment of compute services across multiple clusters in an edge network may allow for more efficient use of compute resources and may provide better service and/or lower latency relative to deployment within a single, centralized cluster. However, devices that are positioned at the edge of such systems—so-called "edge" devices—far from the data centers of the architectures are often resource-constrained devices. For example, edge computing devices may include battery-powered sensors, internet-of-things devices that include minimal computing hardware, etc. Minimization of compute load and/or power consumption by such devices is often highly prioritized. Accordingly, use of the various techniques described herein for updating and/or determining message format data may reduce power consumption, message size, latency, and/or CPU usage.

Examples of messaging architectures include asynchronous Event-driven architectures (EDAs) as well as synchronous messaging protocols. The various techniques described herein for modifying and/or determining message data formats may be used in any messaging protocol. In EDAs, entities generating data are referred to as "publishers," while the recipients/consumers of such data are referred to as "subscribers." Communication in EDAs is referred to as asynchronous because a publisher need not wait for a response from any subscribers prior to generating/publishing additional data. By contrast, in a synchronous messaging architecture such as those provided by REST APIs, a sender waits for a response from a recipient prior to sending additional data.

EDAs typically employ infrastructure called a "message broker" that receives messages (data) from publishers and delivers the messages to subscribers that have registered to receive such messages. Examples of message brokers include RabbitMQ, Apache Kafka, JBoss Messaging, Solace, etc. Accordingly, publishers may be data generating software/hardware that sends messages to the message broker. For example, a publisher may be a smart thermostat that sends temperature data to a message broker, a social media network that sends new subscriber data to a message broker, a smart refrigerator that sends data regarding food stored in the refrigerator to a message broker, etc. Publishers may be any type of application and/or embedded systems that generate and send data using an EDA. Subscribers may be applications that connect to the message broker, manifest an interest in a certain type of message (e.g., messages assigned to a particular "topic"), and maintains the connection with the message broker so that the message broker is able to push the messages to the subscriber. Various other messaging protocols may send messages directly from a sender device to a receiver device in a point-to-point fashion without intermediary devices.

Messages are data that are sent between two devices and/or applications. For example, messages may be sent from a sender device to a receiver device. In another example, messages may be sent by publishers to a message broker, and then pushed by the message broker to the relevant subscribers (e.g., receivers). The content of messages can be any data. Such messages are often described as events or commands. Events communicate a fact (e.g., a temperature detected by the thermostat), while commands provide executable instructions to cause the subscriber application to take a particular action.

Messages may be sent from senders using a variety of different protocols. Examples of such protocols may include, but are not limited to, message queuing telemetry transport (MQTT), constrained application protocol (CoAP), advanced message queuing protocol (AMQP), hypertext transfer protocol (HTTP), etc. Accordingly, asynchronous application programming interfaces (APIs) (e.g., AsyncAPI) may be similar to synchronous APIs (e.g., OpenAPI), but may include different data formats. In various illustrative examples used herein, EDAs are described. However, the various data format modification and/or identification techniques described herein are applicable to any messaging architecture, whether synchronous or asynchronous.

FIG. 1 is a block diagram of a system 100 comprising a computer messaging architecture 124, according to various examples of the present disclosure. The messaging architecture 124 may be implemented using software, hardware, and/or some combination thereof. In various examples, the messaging architecture 124 may include one or more senders 121 and one or more receivers 123. The senders 121 may be hardware and/or software (e.g., applications) that may send messages via network 104 to the receivers 123. FIG. 1 depicts example components that may be included in various implementations of senders 121 and/or receivers 123. For example, senders 121 and/or receivers 123 may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 155, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 155). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 155 may be a VM executing on physical host 110A.

Senders 121 and/or receivers 123 may run one or more VMs (e.g., VMs 155), by executing a software layer (e.g., hypervisor 120) above the hardware and below the VM 155, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 155 as devices, including virtual central processing unit ("VCPU") 190A, virtual memory devices ("VMD") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 155 may be a virtual machine and may execute a guest operating system 196A which may utilize the underlying VCPU 190A, VMD 192A, and VI/O 194A. Processor virtualization may be implemented by the hypervisor 120 scheduling time slots on physical CPUs 112A such that from the guest operating system's perspective those time slots are scheduled on a virtual processor 190A. VM 155 may run on any type of dependent, independent, compatible, and/or incompatible applications on the underlying hardware and host operating system 118. The hypervisor 120 may manage memory for the host operating system 118 as well as memory allocated to the VM 155 and guest operating system 196A such as guest memory 195A provided to guest OS 196A. In an example, storage container 160 and/or service containers 150A, 150B are similarly implemented.

In an example, in addition to distributed storage provided by storage container 160, storage controller 142 may additionally manage storage in dedicated storage nodes (e.g., NAS, SAN, etc.). In an example, storage controller 142 may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to orchestrator 140. In the example, storage controller 142 may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across multiple clusters (not shown in FIG. 1).

The various virtualized computing systems (e.g., service containers 150A, 150B, VM 155) may be examples of computing environments that may deploy one or more of the techniques described herein for sending, storing, determining, and/or modifying message data formats of messages 141. For example, service container 150A may parse received messages 141 to determine data format identifiers. Service container 150B may detect and/or apply patches to previously-stored data formats (e.g., stored in data structure 106). VM 155 may receive messages 141 and may use included data format identifier to lookup the data format associated with the data format identifier. VM 155 may thereafter read the received message using the data format. The foregoing example is merely one possible implementation of a messaging architecture 124. The actual deployment of the various services and/or systems of the messaging architecture 124 are implementation-specific details and may be modified as desired in accordance with the present disclosure. The messaging architecture 124 may be deployed across any number of physical computing devices and/or virtualized computing environments, depending on the desired implementation.

In an example, a receiver 123 may receive a message 141 from a sender 121. The receiver 123 may include logic effective to parse the message 141 and determine a data format identifier included in the message 141 (e.g., in a header of the message 141). The receiver 123 may use the data format identifier to lookup a data format (e.g., a data format definition) stored in data structure 106 in association with the data format identifier. Below is an example of data format of a message called "lightMeasured." In this example, the data format identifier may be "lightMeasured", although in other examples numerical identifiers and/or any other type of data that identifies the message format from among other message formats may be used.

An example data format of the lightMeasured messages may be:

```
87 messages:
88   lightMeasured:
89     name: lightMeasured
90     title: Light measured
91     summary: Inform about environmental lighting conditions for a particular streetlight.
92     contentType: application/json
93     traits:
94       - $ref: '#/components/messageTraits/commonHeaders'
95     payload:
96       $ref: "#/components/schemas/lightMeasuredPayload"
```

In this example, the data format of lightMeasured messages includes references (e.g., lines 94, 96) to other sources at which portions of the data format definition may be available. Such sources may be internal to the payload of the message and/or may be present at external locations.

After determining such a data format (e.g., using a data format identifier included in the message 141) the receiver 123 may include logic to parse data included in the payload of the message 141 using the data format. Data formats may sometimes be referred to as message "schemas." In various examples described in further detail below, some messages 141 may include patches effective to modify data format definitions that were previously stored by a receiver 123 in data structure 106. In such examples, receiver 123 may parse the message 141 to detect the patch and may use a data format identifier included in the message 141 to lookup the appropriate data format stored in data structure 106 to which to apply the patch. The patch may include executable instructions effective to modify the stored data format. Receiver 123 may modify the stored data format using the patch and may store the modified data format in the data structure. Subsequent messages 141 including the same data format identifier may be used to retrieve the modified data format which, in turn, may be used to parse and/or read payloads of the subsequent messages 141.

Figure 2:
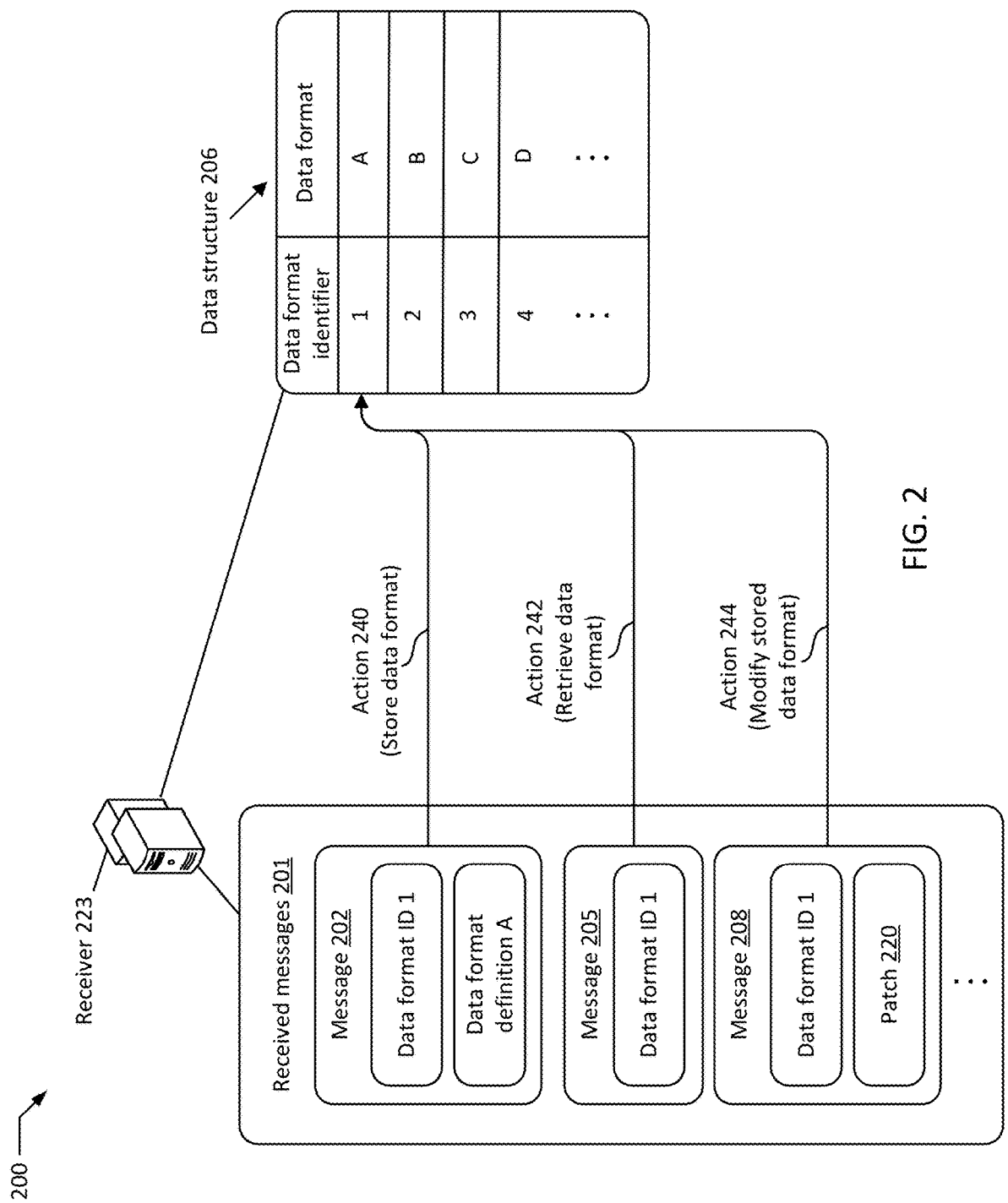
FIG. 2 is a block diagram illustrating updating a message data format by a receiver device, according to various examples of the present disclosure.

FIG. 2 is a block diagram 200 illustrating updating a message data format by a receiver device, according to various examples of the present disclosure. As depicted in FIG. 2, receiver 223 may receive multiple received messages 201. In an example, the receiver 223 may subscribe to these messages using a message broker of an EDA. In other examples, the received messages 201 may be received directly from a sender device.

Message 202 of received messages 201 may include data format ID 1 and data format definition A. In this example, message 202 may be an initial message of a communication session with the sender. In some examples, receiver 223 may parse message 202 and may detect the data format ID 1 included in the message 202. The receiver 223 may search data structure 206 using the data format ID 1 as a query in a lookup operation. In an example, the data format ID 1 may not be found in the data structure 206. Receiver 223 may store the data format ID 1 in the data structure 206 in association with the data format definition A that is included in message 202. Accordingly, action 240 may involve the receiver 223 receiving a message 202 of a new type. The new type of message 202 may include both a data format identifier (e.g., data format ID 1) and the data format definition (e.g., data format definition A). Since the data format definition has not been previously stored by receiver 223 in data structure 206, receiver may create a new entry in data structure 206 by storing the data format definition A in association with the data format ID 1 in the data structure 206.

Subsequently, receiver 223 may receive message 205. Message 205 may be parsed to determine its contents. Receiver 223 may determine that a data format ID 1 is included, but that no patch or data format definition is included. Receiver 223 may search data structure 206 using data format ID 1 to determine if a data format definition (sometimes referred to herein as a "data format") was previously stored in data structure 206. In the current example, data format definition A was previously stored in association with data format ID 1 (e.g., at action 240). Accordingly, at action 242, receiver 223 may retrieve data format definition A and may use data format definition A to parse and/or read a payload of message 205.

In the example depicted in FIG. 2, message 208 may be received. Message 208 may be parsed by receiver 223 to determine its contents. Receiver 223 may determine that message 208 includes data format ID 1 and a patch 220, but that the message 208 does not include a data format definition. Receiver 223 may search data structure 206 using data format ID 1 to determine if a data format definition (e.g., a "data format") was previously stored in data structure 206. In the current example, data format definition A was previously stored in association with data format ID 1 (e.g., at action 240). However, in this example, because message 208 also includes a patch 220, receiver 223 may modify data format definition A using the patch 220 prior to reading the message 208. Accordingly, receiver 223 may execute instructions included in patch 220 in order to modify the previously-stored data format definition A. Receiver 223 may overwrite the old data format definition A with the modified data format definition A at action 244. Thereafter, receiver 223 may use the modified data format definition A to read messages which include data format ID 1.

In this way, sender devices (e.g., senders 121 of FIG. 1) may only need to send full data formats with initial messages sent at the beginning of a message communication session. Thereafter, the sender devices may send only data format identifiers that can be used by receivers 223 to lookup the previously-sent and stored data format associated with the data format identifiers. Additionally, when the format is to be updated, the senders may send patches that may be used by receivers 223 to modify the previously-stored data formats. Senders may send messages of different types and each different message type may be associated with its own data format identifier that identifies the message type from among other message types and with its own data format definition. Accordingly, in FIG. 2, data format ID 1 identifies data format A, data format ID 2 identifies data format B, data format 3 identifies data format C, data format 4 identifies data format D, etc.

Allowing edge computing devices and/or other resource-constrained devices to send only data format identifier data and/or patch updates while minimizing the need to send the full data format definition conserves compute resources and/or battery life of such devices. Additionally, to update a previously-established data format definition, a sender device can send the data format ID that identifies that data format definition, along with the patch, without being required to again send the full data format definition.

Figure 3:
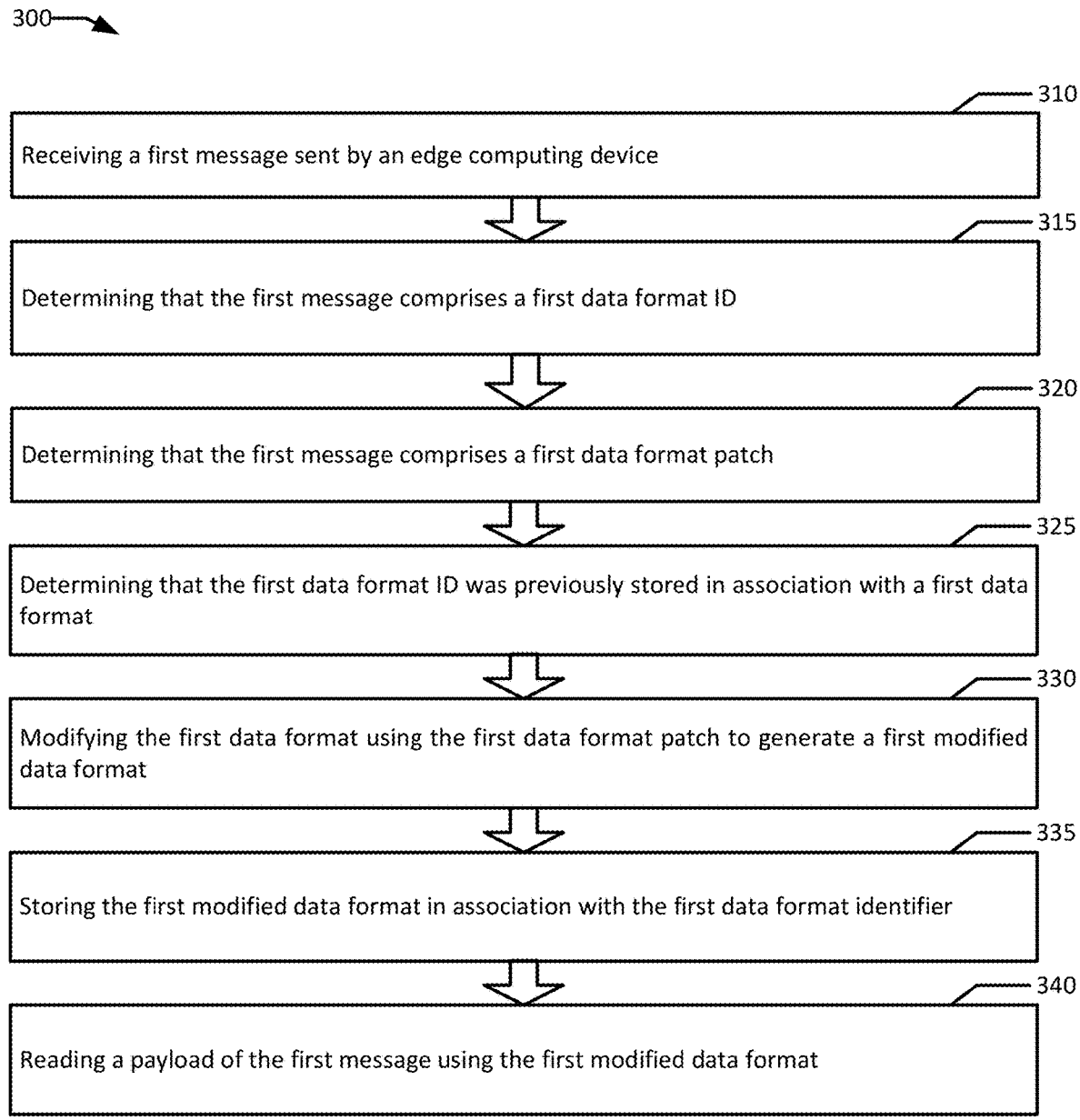
FIG. 3 is flowchart illustrating an example process for updating a message format by a receiver device according to an example of the present disclosure.

FIG. 3 is flowchart illustrating an example process 300 for updating a message format by a receiver device according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes receiving a first message sent by an edge computing device (block 310). As used herein, an edge computing device may be a device that is resource constrained and/or that is deployed at the edge of a distributed computing network. Examples of such devices may include battery-powered sensors, integrated Internet-of-Things devices, etc. The first message may include a header and/or a payload.

In an example, the process 300 may include determining that the first message includes a first data format ID (block 315). For example, logic of the receiver device may be used to parse the message to determine that a data format ID is included (e.g., in a header of the message).

In an example, the process 300 may include determining that the first message includes a first data format patch (block 320). For example, logic of the receiver may be effective to parse the first message to determine a patch that is included in the first message. In various examples, the patch may be applicable to modify a previously-stored data format that is stored by the receiver in a data structure in association with the first data format ID.

In an example, the process 300 may include determining that the first data format ID was previously stored in association with a first data format (block 325). For example, the receiver may query a data structure using the first data format ID and may determine that the first data format ID was previously stored in the data structure in association with a first data format. In various examples, the first data format may have been received in a previous message that may have also included the first data format ID.

In an example, the process 300 may include modifying the first data format using the first data format patch to generate a first modified data format (block 330). In various examples, the first data format patch may include computer-executable instructions configured to modify the first data format. The receiver may execute the computer-executable instructions and may thereby modify the first data format and generate the first modified data format.

In an example, the process 300 may include storing the first modified data format in association with the first data format identifier (block 335). For example, the receiver may overwrite the previous first data format in the data structure with the first modified data format generated using the first data format patch. Accordingly, the first data format ID may now be associated with the first modified data format in the data structure. Subsequent messages including the first data format ID may now be used to retrieve the first modified data format which may, in turn, be used to read such messages.

In an example, the process 300 may include reading a payload of the first message using the first modified data format (block 340). The first modified data format may be used to parse and read the payload of the first message. For example, the first modified data format may define various data fields and/or byte structures of the first message.

Figure 4:
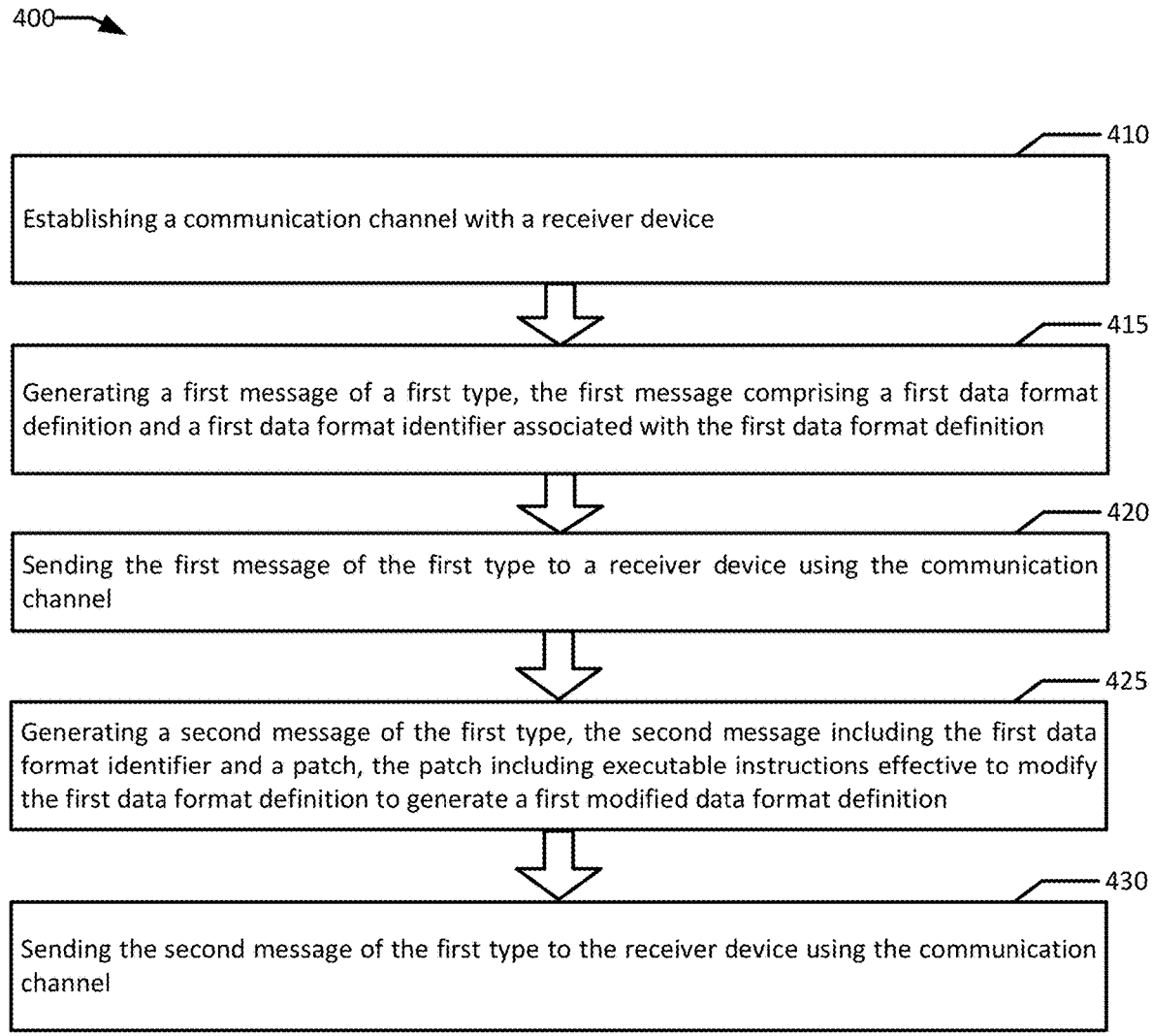
FIG. 4 is flowchart illustrating an example of providing an updated message format by a sender device according to an example of the present disclosure.

FIG. 4 is flowchart illustrating an example process 400 for providing an updated message format by a sender device according to an example of the present disclosure. Although the example process 400 is described with reference to the flowchart illustrated in FIG. 4, it will be appreciated that many other methods of performing the acts associated with the process 400 may be used. For example, the order of some of the blocks may be changed, certain blocks may be combined with other blocks, blocks may be repeated, and some of the blocks described may be optional. The process 400 may be performed by processing logic that may comprise hardware (circuitry, dedicated logic, etc.), software, or a combination of both. In some examples, the actions described in the blocks of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 400 includes establishing a communication channel with a receiver device (block 410). For example, a messaging protocol may be established and used to define communication standards between the sender and receiver device. In various examples, authentication and/or encryption protocols may be used to authenticate the sender and receiver devices to one another and/or to define encryption standards for data sent via the communication channel.

The example process 400 may include generating a first message of a first type. In various cases, the first message may include a first data format definition and a first data format identifier associated with the first data format definition (block 415). In various examples, a sender device (e.g., an edge computing device such as a battery-powered image sensor and/or other sensor) may generate a first message including a first data format definition pertaining to the first message and a first data format identifier that identifies the first data format definition from among other data format definitions.

The example process 400 may include sending the first message of the first type to a receiver device using the communication channel (block 420). In various examples, the first message of the first type may be sent via a message broker. In some other examples, the first message of the first type may be sent directly from a sender to a receiver.

The example process 400 may include generating a second message of the first type. In various examples, the second message may include the first data format identifier and a patch. The patch may include executable instructions configured to modify the first data format definition to generate a modified data format definition (block 425). In various examples, the patch may be a patch used to modify the previously-sent first data format definition. The first data format identifier may be used by the receiver to retrieve the correct data format definition to which to apply the patch.

The example process 400 may include sending the second message of the first type to the receiver device using the communication channel (block 430). In various examples, the second message of the first type may be sent via a message broker or by direct device-to-device communication depending on the desired implementation and/or on the particular messaging protocol being used.

Figure 5A:
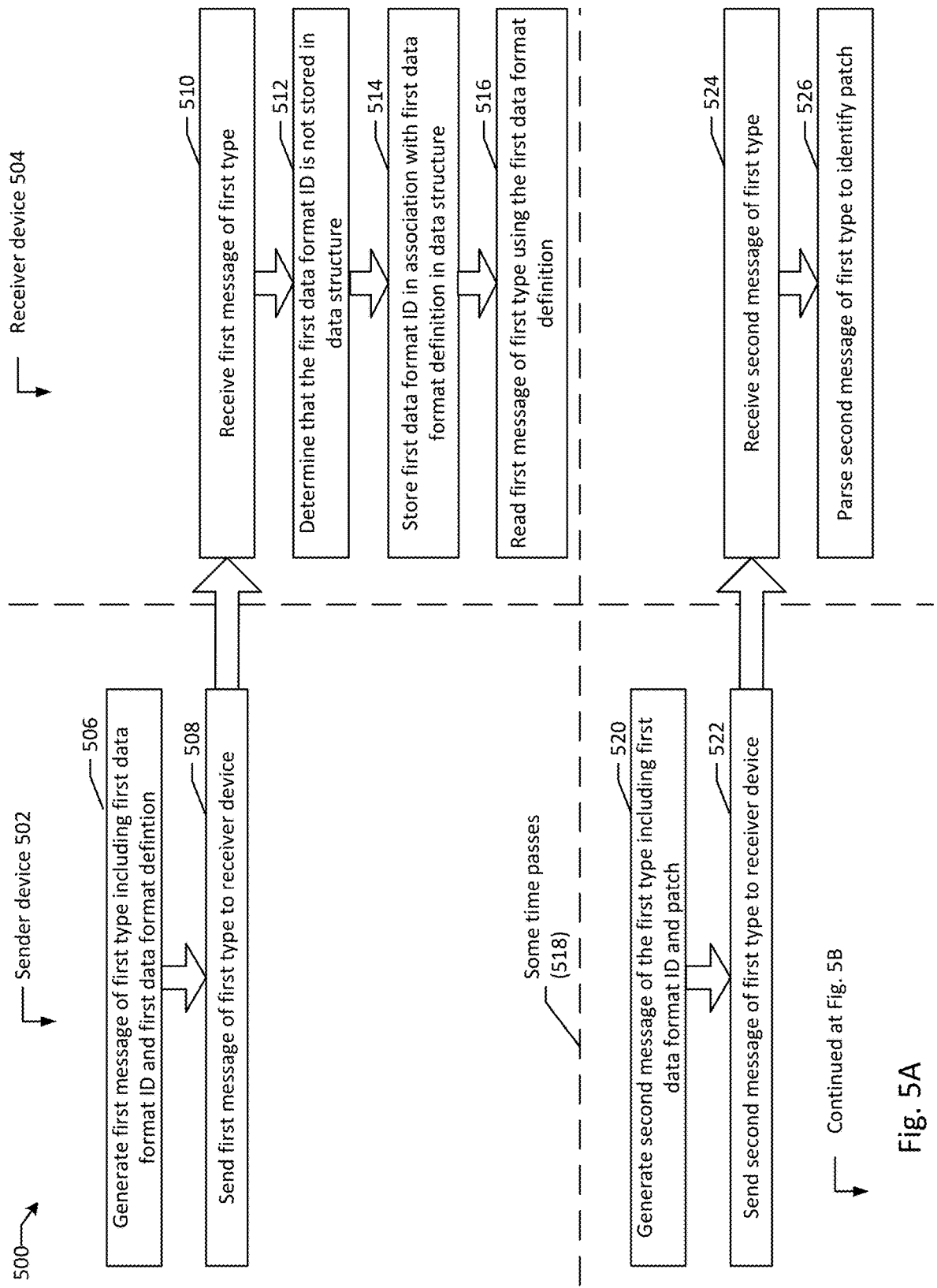
FIGS. 5A and 5B illustrate a flow diagram of an example of message data format communication between a sender device and a receiver device according to various aspects of the present disclosure.
Figure 5B:
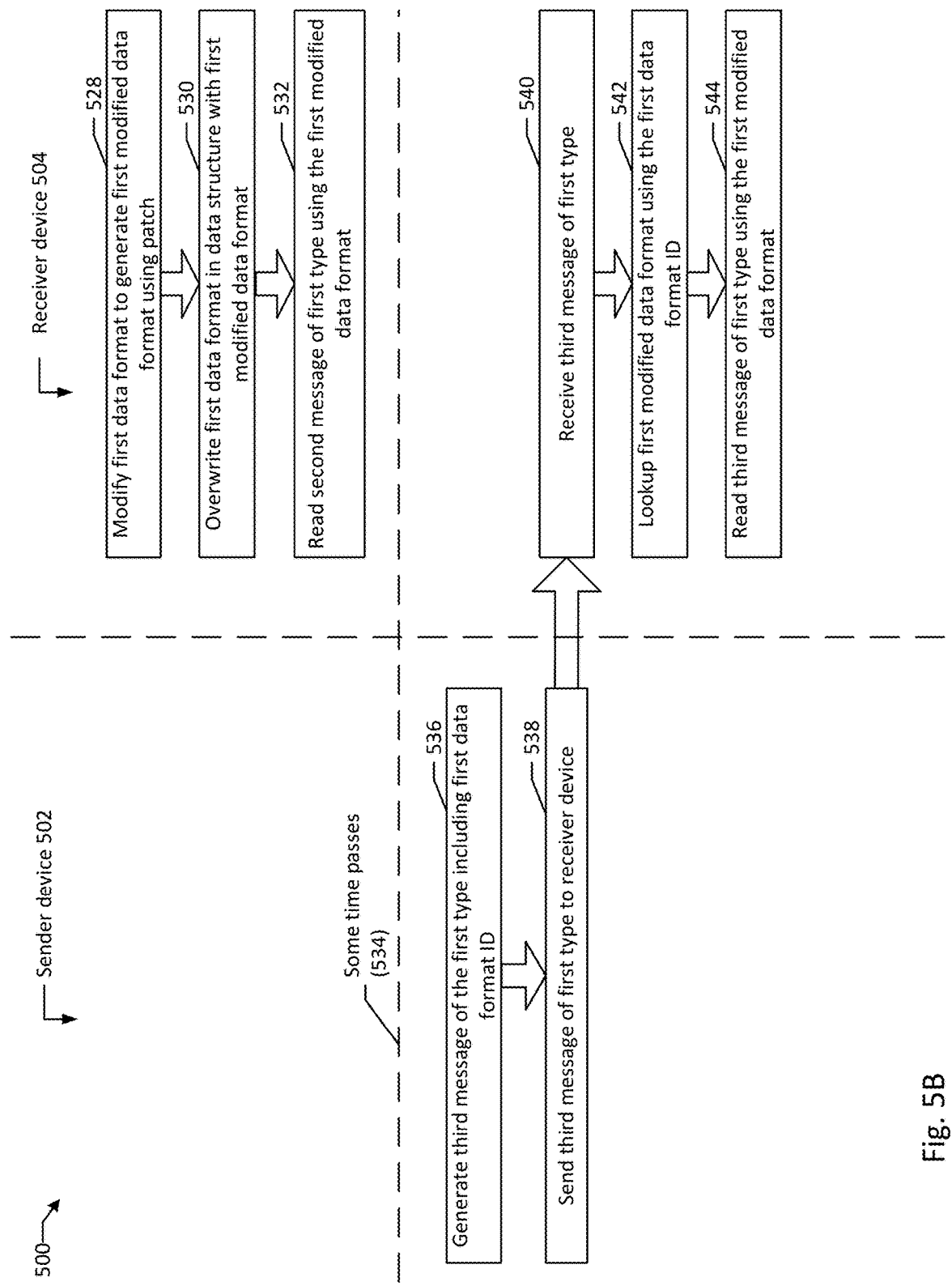

FIGS. 5A and 5B illustrate a flow diagram 500 of an example of message data format communication between a sender device 502 and a receiver device 504 according to various aspects of the present disclosure. Although the examples below are described with reference to the flow diagram illustrated in FIGS. 5A and 5B, it will be appreciated that many other methods of performing the acts associated with FIGS. 5A and 5B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the example depicted in FIG. 5A, sender device 502 may generate a first message of a first type (block 506). The first message may include a first data format identifier that identifies a first data format definition. Additionally, the first message may include the first data format definition (e.g., in a payload of the first message). The sender device 502 may send the first message of the first type to receiver device 504 (block 508). As previously described, the first message may be sent over a network to receiver device 504 and/or may be sent to receiver device 504 via a message broker (e.g., such as whether sender device 502 is a publisher device of an EDA and receiver device 504 is a subscriber device).

Receiver device 504 may receive the first message of the first type (block 510). In various examples, receiver device 504 may determine that the first data format ID has not been previously stored in a data structure that is configured in communication with receiver device 504 (block 512). Accordingly, receiver device 504 may store the first data format definition in the data structure in association with the first data format ID (block 514). In various examples, receiver device 504 may use the first data format definition to parse and/or read the payload of the first message of the first type (block 516). However, in some examples, the first message of the first type may include only the first data format ID and the first data format definition.

Some time may pass after the receiver device 504 reads the first message of the first type using the first data format definition (block 518). Thereafter, sender device 502 may generate a second message of the first type. The second message of the first type may include the first data format ID and patch data (block 520). The patch data may comprise executable instructions configured to modify the first format definition. Sender device 502 may send the second message of the first type to the receiver device 504 (block 522).

Receiver device 504 may receive the second message of the first type (block 524). Logic of the receiver device 504 may be used to parse the second message of the first type to identify the patch included in the second message of the first type (block 526). Processing may continue at FIG. 5B. For example, receiver device 504 may modify the first data format to generate a first modified data format using the patch data (block 528). In various examples, the receiver device 504 may use the first data format ID included in the second message of the first type to lookup the first data format stored in the data structure in association with the first data format ID. Receiver device 504 may overwrite the first data format that was previously stored in the data structure with the first modified data format (block 530) that was modified using the patch. Receiver device 504 may read the second message of the first type using the first modified data format (block 532). Thereafter, some time may pass (block 534).

Sender device 502 may generate a third message of the first type that includes the first data format ID (block 536). The sender device 502 may send the third message of the first type to the receiver device 504 (block 538). The receiver device 504 may receive the third message of the first type (block 540). The receiver device 504 may parse the third message to identify the first data format ID and may perform a lookup operation using the first data format ID to identify the first modified data format stored in the data structure (block 542). The receiver device 504 may thereafter read the third message of the first type using the first modified data format (block 544).

Figure 6:
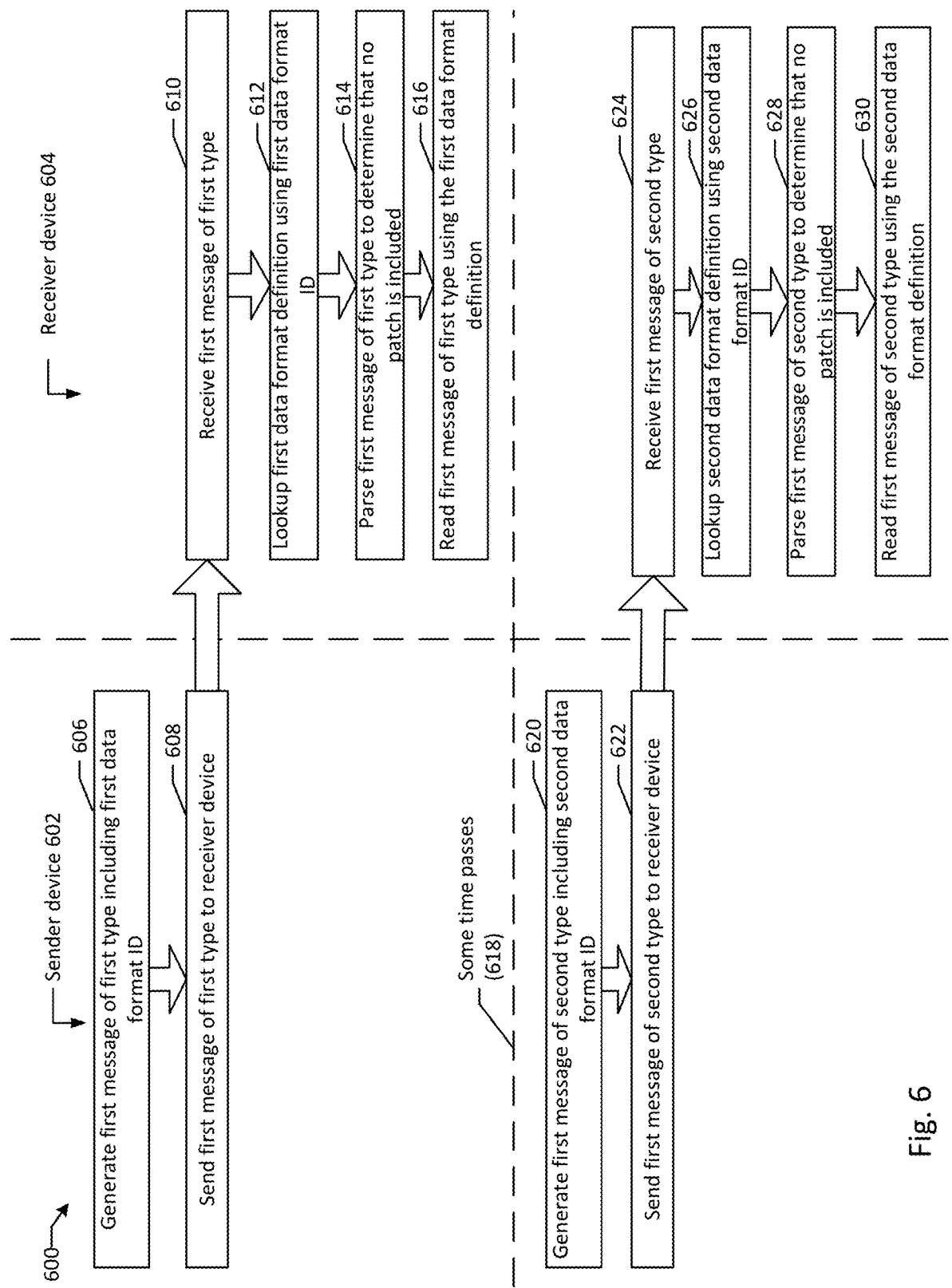
FIG. 6 illustrates a flow diagram of an example of determining data formats of messages of different types in accordance with various aspects of the present disclosure.

FIG. 6 illustrates a flow diagram 600 of an example of determining data formats of messages of different types in accordance with various aspects of the present disclosure. Although the examples below are described with reference to the flow diagram illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the illustrated example flow diagram 600, sender device 602 may generate a first message of a first type including a first data format ID (block 606). In various examples, the sender device 602 may be one or more of a sensor, an embedded system, an edge computing device, an internet-of-things device, a resource constrained device, etc. In an example, the first message of the first type may be a message of a first topic of an EDA. For example, the sender device may be a camera device and may send video data to subscriber devices. The video data may be formatted according to a first data format that is identified by the first data format ID. The sender device 602 may send the first message of the first type to receiver device 604 (block 608).

Receiver device 604 may receive the first message of the first type (block 610). Receiver device 604 may identify the first data format ID included in the first message of the first type. Receiver device may lookup a first data format definition using the first data format ID to query a data structure (block 612). Receiver device 604 may parse the first message of the first type to determine that no patch is included in the first message of the first type (block 614). Accordingly, no update of the first data format definition is to be performed at the current stage of processing. Receiver device 604 may read the first message of the first type (e.g., the payload of the first message of the first type) using the first data format definition (block 616). For example, the first data format definition may be machine-readable data that provides instructions for how to parse and/or interpret messages of the first type. Thereafter, some time may pass (block 618).

Sender device 602 may generate a first message of a second type. The first message of the second type may include a second data format ID that is different from the first data format ID (block 620). In various examples, the second data format ID may identify a different data format definition relative to the first data format definition identified by the first data format ID. In the example above where the sender device 602 is a camera device, the first message of the second type may be audio data, telemetry data, etc. The audio data, telemetry data, etc. may be formatted according to a second data format that is identified by the second data format ID. Sender device 602 may send the first message of the second type to the receiver device 604 (block 622).

The receiver device 604 may receive the first message of the second type (block 624). Receiver device 604 may lookup a second data format definition using the second data format ID (block 626). For example, receiver device 604 may use the second data format ID as a query to search a data structure in which the second data format ID is stored in association with the second data format definition. Receiver device 604 may parse the first message of the second type to determine that no patch is included in the first message of the second type (block 628). Accordingly, no update of the second data format definition is to be performed at the current stage of processing. Receiver device 604 may read the first message of the second type using the second data format definition (block 630).

Accordingly, as illustrated in the example of FIG. 6, sender devices may send messages of different types and the sender device need only include the full data format definition in a first message of a given type. Thereafter, once the data format definition has been stored in memory on the receiver side, the sender device need only send the data format ID to have the message correctly read. Additionally, the sender device can switch between different message types associated with different data formats by switching the data format ID included in the messages of different types—provided that the full data format definition has previously been provided to the receiver device.

In some examples, the receivers and/or receiver devices described herein may be less resource constrained relative to the sender devices. Accordingly, in some examples, in order to provide fault tolerance, the receiver devices may keep a log of messages received from the sender devices. In such logs, the receiver devices may keep a record of data format definitions, data format IDs, and patches sent by the sender.

Accordingly, if the data structure of the receiver device is corrupted, the log may be consulted to determine and/or rebuild the appropriate data format definition including any applicable patches.

FIG. 7 is block diagram of a system 700 in which message data format information is communicated between an edge computing device 712 and a first computing device 702 (e.g., a receiver device) according to an example of the present disclosure. The system 700 may include a first computing device 702 configured in communication with an edge computing device 712. In various examples, the first computing device 702 may be a receiver device that comprises at least one processor 704, a receiver 706 (e.g., a receiver circuit of a radio), and a non-transitory computer-readable memory 708 in communication with the at least one processor 704. Non-transitory computer-readable memory 708 may store instructions 710 that, when executed by the at least one processor 704, may be configured to perform one or more of the various techniques described herein. First computing device 702 may include a data structure 718. In at least some examples, the data structure 718 may be part of the non-transitory computer-readable memory 708, while in other examples, the data structure 718 may be a separate component.

Edge computing device 712 may send a first message 714 to first computing device 702. In various examples, receiver 706 of first computing device 702 may receive the first message 714. The first message 714 may include first data format ID 716 (e.g., a first data format identifier), first data format patch 720, and/or payload 730. The first data format ID 716 may be used to search the data structure 718 to determine that the first data format ID 716' was previously stored in the data structure 718 in association with first data format 722. First data format 722 may be a data format definition for interpreting, parsing, and/or reading messages received by the first computing device 702. In various examples, instructions 710 may be configured to cause the at least one processor 704 to determine that the first message 714 includes the first data format patch 720. The instructions 710 may be further configured to cause the at least one processor 704 to modify the first data format 722 to generate a first modified data format 724. The instructions 710 may be further configured to cause the at least one processor 704 to store the first modified data format 724 in the data structure in association with the first data format ID 716". The instructions 710 may be further configured to cause the at least one processor 704 to read the payload 730 of the first message 714 using the first modified data format 724.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st example aspect of the present disclosure, a device comprises at least one processor, a receiver, and non-transitory computer-readable memory. The non-transitory computer-readable memory stores instructions that, when executed by the at least one processor are configured to receive, by the receiver, a first message sent by an edge computing device. The instructions may be further configured to determine that the first message comprises a first data format identifier. The instructions may be further configured to determine that the first message comprises a first data format patch. In some examples, the instructions may be further configured to determine that the first data format identifier was previously stored in a data structure in association with a first data format. In some cases, the instructions may be further configured to modify the first data format using the first data format patch to generate a first modified data format. In some examples, the instructions may be further configured to store the first modified data format in the data structure in association with the first data format identifier. In various examples, the instructions may be further configured to read a payload of the first message using the first modified data format.

In accordance with a 2nd example aspect of the present disclosure, which may be used in combination with any one or more of other aspects described herein (e.g., the 1st aspect), wherein the non-transitory computer-readable memory stores further instructions that, when executed by the at least one processor, are further configured to: receive, from the receiver, a second message sent by the edge computing device; determine that the second message comprises the first data format identifier; determine that the first data format identifier is stored in association with the first modified data format in the data structure; and read a payload of the second message using the first modified data format.

In accordance with a 3rd example aspect of the present disclosure, which may be used in combination with any one or more of other aspects described herein (e.g., the 1st aspect), wherein the non-transitory computer-readable memory stores further instructions that, when executed by the at least one processor, are further configured to receive, from the receiver, a second message sent by the edge computing device, determine that the second message comprises a second data format identifier, determine that the second data format identifier has not been stored in the data structure, determine that the second message comprises data defining a second data format, store the data defining the second data format in the data structure in association with the second data format identifier, and read a payload of the second message using the second data format.

In accordance with a 4th example aspect of the present disclosure, which may be used in combination with any one or more of other aspects described herein (e.g., the 1st aspect), wherein the non-transitory computer-readable memory stores further instructions that, when executed by the at least one processor, are further configured to receive, from the receiver, a second message sent by the edge computing device, parse the second message to determine if a patch is included in the second message, and determine that the second message does not include a patch.

In accordance with a 5th example aspect of the present disclosure, which may be used in combination with any one or more of other aspects described herein (e.g., the 4th aspect), wherein the non-transitory computer-readable memory stores further instructions that, when executed by the at least one processor, are further configured to determine that the second message comprises the first data format identifier, determine that the first data format identifier is stored in association with the first modified data format in the data structure, and read a payload of the second message using the first modified data format.

In accordance with a 6th example aspect of the present disclosure, which may be used in combination with any one or more of other aspects described herein (e.g., the 1st aspect), wherein the non-transitory computer-readable memory stores further instructions that, when executed by the at least one processor, are further configured to receive, from the receiver, a second message sent by the edge computing device, parse the second message to determine if a patch is included in the second message, determine that the second message includes a first modified data format patch, determine that the second message comprises the first data format identifier, determine that the first data format identifier was previously stored in the data structure in association with the first modified data format, modify the first modified data format using the first modified data format patch to generate a second modified data format, and overwrite the first modified data format with the second modified data format in the data structure.

In accordance with a 7th example aspect of the present disclosure, which may be used in combination with any one or more of other aspects described herein (e.g., the 6th aspect), wherein the non-transitory computer-readable memory stores further instructions that, when executed by the at least one processor, are further configured to read a payload of the second message using the second modified data format.

In accordance with an 8th example aspect of the present disclosure, which may be used in combination with any one or more of other aspects described herein (e.g., the 1st aspect), wherein the first message is sent using an asynchronous messaging protocol.

In accordance with a 9th example aspect of the present disclosure, which may be used in combination with any one or more of other aspects described herein (e.g., the 1st aspect), wherein the first message is sent by a battery-powered edge computing device using an asynchronous messaging protocol.

In accordance with a 10th example aspect of the present disclosure, which may be used in combination with any one or more of other aspects described herein (e.g., the 1st aspect), wherein the non-transitory computer-readable memory stores further instructions that, when executed by the at least one processor, are further configured to receive, from the receiver, a second message sent by the edge computing device, determine that the second message comprises a second data format identifier, determine a second data format stored in the data structure in association with the second data format identifier, and read a payload of the second message using the second data format.

Aspects of the subject matter described herein may be useful alone or in combination with one or more other aspects described herein. In an 11th example aspect of the present disclosure, a method comprises receiving a first message sent by an edge computing device, determining that the first message comprises a first data format identifier, determining that the first message comprises a first data format patch, determining that the first data format identifier was previously stored in a data structure in association with a first data format, modifying the first data format using the first data format patch to generate a first modified data format, storing the first modified data format in the data structure in association with the first data format identifier, and reading a payload of the first message using the first modified data format.

In accordance with a 12th example aspect of the present disclosure, which may be used in combination with any one or more of other aspects described herein (e.g., the 11th aspect), receiving a second message sent by the edge computing device, determining that the second message comprises the first data format identifier, determining that the first data format identifier is stored in association with the first modified data format in the data structure, and reading a payload of the second message using the first modified data format.

In a 13th example aspect of the present disclosure, which may be used in combination with any one or more of other aspects described herein (e.g., the 11th aspect), receiving a second message sent by the edge computing device, determining that the second message comprises a second data format identifier, determining that the second data format identifier has not been stored in the data structure, determining that the second message comprises data defining a second data format, storing the data defining the second data format in the data structure in association with the second data format identifier, and reading a payload of the second message using the second data format.

In a 14th example aspect of the present disclosure, which may be used in combination with any one or more of other aspects described herein (e.g., the 11th aspect), receiving a second message sent by the edge computing device, parsing the second message to determine if a patch is included in the second message, and determining that the second message does not include a patch.

In a 15th example aspect of the present disclosure, which may be used in combination with any one or more of other aspects described herein (e.g., the 14th aspect), determining that the second message comprises the first data format identifier, determining that the first data format identifier is stored in association with the first modified data format in the data structure, and reading a payload of the second message using the first modified data format.

In a 16th example aspect of the present disclosure, which may be used in combination with any one or more of other aspects described herein (e.g., the 11th aspect), receiving a second message sent by the edge computing device, parsing the second message to determine if a patch is included in the second message, determining that the second message includes a first modified data format patch, determining that the second message comprises the first data format identifier, determine that the first data format identifier was previously stored in the data structure in association with the first modified data format, modifying the first modified data format using the first modified data format patch to generate a second modified data format, and overwriting the first modified data format with the second modified data format in the data structure.

In accordance with a 17th example aspect of the present disclosure, which may be used in combination with any one or more of other aspects described herein (e.g., the 16th aspect), reading a payload of the second message using the second modified data format.

In accordance with an 18th example aspect of the present disclosure, which may be used in combination with any one or more of other aspects described herein (e.g., the 11th aspect), wherein the first message is sent using an asynchronous messaging protocol.

In accordance with a 19th example aspect of the present disclosure, which may be used in combination with any one or more of other aspects described herein (e.g., the 11th aspect), wherein the first message is sent by a battery-powered edge computing device using an asynchronous messaging protocol.

In accordance with a 20th example aspect of the present disclosure, which may be used in combination with any one or more of other aspects described herein (e.g., the 11th aspect), receiving a second message sent by the edge computing device, determining that the second message comprises a second data format identifier, determining a second data format stored in the data structure in association with the second data format identifier, and reading a payload of the second message using the second data format.

Aspects of the subject matter described herein may be useful alone or in combination with one or more other aspects described herein. In a 21st example aspect of the present disclosure, a method comprising establishing a communication channel with a receiver device, generating a first message of a first type, the first message comprising a first data format definition and a first data format identifier associated with the first data format definition, sending the first message to a receiver device using the communication channel, generating a second message of the first type, the second message comprising the first data format identifier and a patch, the patch comprising executable instructions effective to modify the first data format definition to generate a first modified data format definition, and sending the second message of the first type to the receiver device using the communication channel.

In accordance with a 22nd example aspect of the present disclosure, which may be used in combination with any one or more of other aspects described herein (e.g., the 21st aspect), further comprising: generating a third message of the first type, the third message comprising the first data format identifier, wherein the receiver device is configured to: parse the third message to identify the first data format identifier; and lookup the first modified data format definition using the first data format identifier.

In accordance with a 23rd example aspect of the present disclosure, which may be used in combination with any one or more of other aspects described herein (e.g., the 22nd aspect), wherein the receiver device is further configured to read a payload of the third message using the first modified data format definition.

In accordance with a 24th example aspect of the present disclosure, which may be used in combination with any one or more of other aspects described herein (e.g., the 21st aspect), further comprising sending a first message of a second type to the receiver device, the second message comprising a second data format definition and a second data format identifier associated with the second data format definition.

In accordance with a 25th example aspect of the present disclosure, which may be used in combination with any one or more of other aspects described herein (e.g., the 24th aspect), wherein the receiver device is effective to: parse the first message of the second type to determine the second data format definition and the second data format identifier associated with the second data format definition; and store the second data format definition in association with the second data format identifier in a database.

In accordance with a 26th example aspect of the present disclosure, which may be used in combination with any one or more of other aspects described herein (e.g., the 25th aspect), further comprising: generating a second message of the second type, the second message including the second data format identifier and excluding any data format definition; and sending the second message of the second type to the receiver device using the communication channel.

Aspects of the subject matter described herein may be useful alone or in combination with one or more other aspects described herein. In a 27th example aspect of the present disclosure, a device comprises: at least one processor; a transmitter; and non-transitory computer-readable memory storing instructions that, when executed by the at least one processor are configured to: establish a communication channel with a receiver device; generate a first message of a first type, the first message comprising a first data format definition and a first data format identifier associated with the first data format definition; send, using the transmitter, the first message of the first type to a receiver device; generate a second message of the first type, the second message comprising the first data format identifier and a patch, the patch comprising executable instructions effective to modify the first data format definition to generate a first modified data format definition; and send, using the transmitter, the second message of the first type to the receiver device.

In accordance with a 28th example aspect of the present disclosure, which may be used in combination with any one or more of other aspects described herein (e.g., the 27th aspect), wherein the non-transitory computer-readable memory stores further instructions that, when executed by the at least one processor, are further configured to: generate a third message of the first type, the third message comprising the first data format identifier, wherein the receiver device is configured to: parse the third message to identify the first data format identifier; and lookup the first modified data format definition using the first data format identifier.

In accordance with a 29th example aspect of the present disclosure, which may be used in combination with any one or more of other aspects described herein (e.g., the 28th aspect), wherein the receiver device is further configured to read a payload of the third message using the first modified data format definition.

In accordance with a 30th example aspect of the present disclosure, which may be used in combination with any one or more of other aspects described herein (e.g., the 27th aspect), wherein the non-transitory computer-readable memory stores further instructions that, when executed by the at least one processor, are further configured to: send, using the transmitter, a first message of a second type to the receiver device using the communication channel, the second message comprising a second data format definition and a second data format identifier associated with the second data format definition.

In accordance with a 31st example aspect of the present disclosure, which may be used in combination with any one or more of other aspects described herein (e.g., the 30th aspect), wherein the receiver device is effective to: parse the first message of the second type to determine the second data format definition and the second data format identifier associated with the second data format definition; and store the second data format definition in association with the second data format identifier in a database.

In accordance with a 32nd example aspect of the present disclosure, which may be used in combination with any one or more of other aspects described herein (e.g., the 31st aspect), wherein the non-transitory computer-readable memory stores further instructions that, when executed by the at least one processor, are further configured to: generate a second message of the second type, the second message including the second data format identifier and excluding any data format definition; and send, using the transmitter, the second message of the second type to the receiver device via the communication channel.

Aspects of the subject matter described herein may be useful alone or in combination with one or more other aspects described herein. In a 33rd example aspect of the present disclosure, a system comprises: a means for receiving a first message sent by an edge computing device; a means for determining that the first message comprises a first data format identifier; a means for determining that the first message comprises a first data format patch; a means for determining that the first data format identifier was previously stored in a data structure in association with a first data format; a means for modifying the first data format using the first data format patch to generate a first modified data format; a means for storing the first modified data format in the data structure in association with the first data format identifier; and a means for reading a payload of the first message using the first modified data format.

In accordance with a 34th example aspect of the present disclosure, which may be used in combination with any one or more of other aspects described herein (e.g., the 33rd aspect), the system further comprising: a means for receiving a second message sent by the edge computing device; a means for determining that the second message comprises the first data format identifier; a means for determining that the first data format identifier is stored in association with the first modified data format in the data structure; and a means for reading a payload of the second message using the first modified data format.

In accordance with a 35th example aspect of the present disclosure, which may be used in combination with any one or more of other aspects described herein (e.g., the 33rd aspect), the system further comprising: a means for receiving a second message sent by the edge computing device; a means for determining that the second message comprises a second data format identifier; a means for determining that the second data format identifier has not been stored in the data structure; a means for determining that the second message comprises data defining a second data format; a means for storing the data defining the second data format in the data structure in association with the second data format identifier; and a means for reading a payload of the second message using the second data format.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A receiver device comprising:
   at least one processor;
   a data structure; and
   a non-transitory computer-readable memory storing instructions that are executable by the at least one processor for causing the at least one processor to perform operations including:
   receiving a first message;

determining that the first message includes a first data format identifier;
determining that the first data format identifier is correlated in the data structure to a first data format definition, the first data format definition including a first message schema;
reading a first payload of the first message using the first data format definition;
receiving a second message;
determining that the second message includes a second data format identifier;
determining that the second data format identifier is correlated in the data structure to a second data format definition, the second data format definition including a second message schema; and
reading a second payload of the second message using the second data format definition.

2. The receiver device of claim 1, wherein the operations further comprise, prior to receiving the first message:
receiving a third message that includes the first data format identifier and the first data format definition; and
based on receiving the third message, storing the first data format identifier and the first data format definition in the data structure, such that the first data format identifier is correlated to the first data format definition in the data structure.

3. The receiver device of claim 2, wherein the operations further comprise:
receiving the third message from a sender device at a start of a communication session between the sender device and the receiver device, wherein the first data format definition is not sent again by the sender device to the receiver device during the communication session.

4. The receiver device of claim 2, wherein the operations further comprise, prior to receiving the second message:
receiving a fourth message that includes the second data format identifier and the second data format definition; and
based on receiving the fourth message, storing the second data format identifier and the second data format definition in the data structure, such that the second data format identifier is correlated to the second data format definition in the data structure.

5. The receiver device of claim 2, wherein the first message and the third message are sent by a sender device.

6. The receiver device of claim 1, wherein the operations further comprise:
receiving a third message that includes the first data format identifier and a modification to the first data format definition;
generating a modified data format definition based on the modification, the modified data format definition being a version of the first data format definition that is adjusted based on the modification;
storing the modified data format definition in association with the first data format identifier in the data structure; and
reading a third payload of the third message using the modified data format definition.

7. The receiver device of claim 1, wherein the first message is of a first type and the second message is of a second type, wherein the first message schema is associated with payloads of messages of the first type, and wherein the second message schema is associated with payloads of messages of the second type.

8. The receiver device of claim 1, wherein the first message is received from a first sender device and the second message is received from a second sender device.

9. The receiver device of claim 1, wherein the first message and the second message are received from a sender device.

10. A method comprising:
receiving, by a receiver device, a first message;
determining, by the receiver device, that the first message includes a first data format identifier;
accessing, by the receiver device, a data structure to determine that the first data format identifier is correlated in the data structure to a first data format definition, the first data format definition including a first message schema;
based on determining that the first data format identifier is correlated in the data structure to the first data format definition, reading, by the receiver device, a first payload of the first message using the first data format definition;
receiving, by the receiver device, a second message;
determining, by the receiver device, that the second message includes a second data format identifier;
accessing, by the receiver device, the data structure to determine that the second data format identifier is correlated in the data structure to a second data format definition, the second data format definition including a second message schema; and
based on determining that the second data format identifier is correlated in the data structure to the second data format definition, reading, by the receiver device, a second payload of the second message using the second data format definition.

11. The method of claim 10, further comprising, prior to receiving the first message:
receiving a third message that includes the first data format identifier and the first data format definition; and
based on receiving the third message, storing the first data format identifier and the first data format definition in the data structure, such that the first data format identifier is correlated to the first data format definition in the data structure.

12. The method of claim 11, further comprising:
receiving the third message from a sender device at a start of a communication session between the sender device and the receiver device, wherein the first data format definition is not sent again by the sender device to the receiver device during the communication session.

13. The method of claim 11, further comprising, prior to receiving the second message:
receiving a fourth message that includes the second data format identifier and the second data format definition; and
based on receiving the fourth message, storing the second data format identifier and the second data format definition in the data structure, such that the second data format identifier is correlated to the second data format definition in the data structure.

14. The method of claim 10, further comprising:
receiving a third message that includes the first data format identifier and a modification to the first data format definition;
generating a modified data format definition based on the modification, the modified data format definition being a version of the first data format definition that is adjusted based on the modification;

storing the modified data format definition in association with the first data format identifier in the data structure; and reading a third payload of the third message using the modified data format definition.

15. The method of claim 10, wherein the first message is of a first type and the second message is of a second type, wherein the first message schema is associated with payloads of messages of the first type, and wherein the second message schema is associated with payloads of messages of the second type.

16. The method of claim 10, wherein the first message is received from a first sender device and the second message is received from a second sender device.

17. The method of claim 10, wherein the first message and the second message are received from a sender device.

18. A sender device, comprising:

at least one processor; and a non-transitory computer-readable memory storing instructions that are executable by the at least one processor for causing the at least one processor to perform operations including:

establishing a communication session with a receiver device;

transmitting, during the communication session, a first message that includes a first data format identifier and a first data format definition to the receiver device; and transmitting, during the communication session, a second message that includes a second data format identifier and a second data format definition to the receiver device;

wherein the sender device is configured to only transmit the first data format definition to the receiver device a single time during the communication session.

19. The sender device of claim 18, wherein the first message is of a first type and the second message is of a second type.

20. The sender device of claim 19, wherein the first data format definition comprises a first message schema usable to parse payloads of messages of the first type, and wherein the second data format definition comprises a second message schema usable to parse payloads of messages of the second type.

* * * * *